(12) United States Patent
Carlson (10) Patent No.: US 6,497,780 B1
(45) Date of Patent: Dec. 24, 2002

(54) METHODS OF PREPARING A MICROPOROUS ARTICLE

(76) Inventor: Steven A. Carlson, 993 Memorial Dr. #101, Cambridge, MA (US) 02138

( * ) Notice: Subject to any disclaimer, the term of this patent is extended or adjusted under 35 U.S.C. 154(b) by 78 days.

(21) Appl. No.: 09/590,457

(22) Filed: Jun. 9, 2000

Related U.S. Application Data (60) Provisional application No. 60/139,031, filed on Jun. 9, 1999.

(51) Int. Cl.[7] .......................... B44C 1/17; B32B 31/20; B32B 19/04; B05D 5/04; H01M 2/14
(52) U.S. Cl. .................. 156/230; 156/231; 156/247; 156/289; 427/146; 427/148; 427/126.3; 427/189; 427/402; 428/206; 428/202; 428/357; 428/211; 428/914; 429/247; 429/251
(58) Field of Search .................... 156/230, 231, 156/238, 239, 242, 247, 289, 276; 428/195, 206, 357, 40.1, 211, 914; 429/247, 142, 251; 427/126.4, 146, 147, 148, 180, 189, 202, 212, 299, 402, 126.3

(56) References Cited

U.S. PATENT DOCUMENTS

| | | | |
|---|---|---|---|
| 5,342,431 A | * | 8/1994 | Anderson et al. ............... 95/45 |
| 5,443,938 A | * | 8/1995 | Sakai .......................... 430/162 |
| 5,463,178 A | | 10/1995 | Suzuki et al. |
| 5,795,425 A | | 8/1998 | Brault et al. |
| 5,837,375 A | | 11/1998 | Brault et al. |
| 6,153,337 A | | 11/2000 | Skotheim et al. |

FOREIGN PATENT DOCUMENTS

| | | | |
|---|---|---|---|
| EP | 0 705 710 A1 | 4/1996 | |
| EP | 850778 A2 | * 7/1998 | ............ B41M/5/00 |
| JP | 11-233144 | 8/1999 | |
| WO | WO 00/02735 | 1/2000 | |

OTHER PUBLICATIONS

Ichinose et al., "A Surface Sol–Gel Process of $TiO_2$ and Other Metal Oxide Films with Molecular Precision", *Chemistry of Materials;* 1997, 9(6), 1296–1298.

* cited by examiner

*Primary Examiner*—J. A. Lorengo
(74) *Attorney, Agent, or Firm*—Jacqueline M. Nicol; Richard L. Sampson (57) ABSTRACT

Provided are methods of preparing an article in which a microporous layer is coated on a temporary carrier substrate and a substrate is then laminated to the microporous layer, prior to removing the temporary carrier substrate from the microporous layer. The microporous layer may comprise one or more microporous xerogel layers. Optionally, the microporous layer assembly may comprise one or more non-microporous coating layers which are in contact with at least one of the microporous xerogel layers, and one of the non-microporous coating layers may be coated on the temporary carrier substrate prior to coating the microporous layer. Also provided are articles, such as electrochemical cells, capacitors, fuel cells, ink jet ink printing media, and filtration media, prepared by such methods.

26 Claims, 2 Drawing Sheets

METHODS OF PREPARING A MICROPOROUS ARTICLE

RELATED APPLICATION

This application claims priority to U.S. Provisional Patent Application Ser. No. 60/139,031, filed Jun. 9, 1999, the contents of which are incorporated herein by reference in their entirety.

TECHNICAL FIELD

The present invention relates generally to the field of articles comprising a microporous layer. More particularly, this invention pertains to methods of preparing an article comprising a microporous layer in which a microporous layer is coated on a temporary carrier substrate and a substrate is then laminated to the microporous layer, prior to removing the temporary carrier substrate from the microporous layer. The present invention also pertains to articles, such as electrochemical cells, capacitors, fuel cells, ink jet printing media, and filtration media, prepared by such methods.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

U.S. patent application Ser. No. 08/995,089 titled "Separators for Electrochemical Cells," filed Dec. 19, 1997, to Carlson et al. of the common assignee, describes microporous layers as separators for use in electrochemical cells in which microporous layers comprise a microporous pseudo-boehmite layer prepared by coating and drying a boehmite sol. The microporous pseudo-boehmite separators and methods of preparing such separators are described for both free standing separators and as a separator layer coated directly onto an electrode or another layer of the cell.

When a microporous layer, such as a microporous separator layer, is coated directly onto an electrode, such as onto the cathode, the microporous separator coating may require a relatively smooth, uniform surface on the electrode and also may require a mechanically strong and flexible electrode layer. For example, for a microporous pseudo-boehmite layer having a xerogel structure, these specific electrode surface and layer properties may be required to prevent excessive stresses and subsequent cracking of the xerogel layer during drying of the pseudo-boehmite coating on the electrode surface and also during fabrication and use of electrochemical cells containing the pseudo-boehmite xerogel layer.

Besides separator-coated electrodes and electrochemical cells, a large variety of other articles comprising a microporous layer may require a relatively smooth, uniform surface on a substrate to which the microporous layer is to be applied. Also, the substrate may need to be mechanically strong and flexible. For example, for a microporous xerogel layer as used in ink jet printing media, such as described, for example, in U.S. Pat. No. 5,463,178 to Suzuki et al., such smooth, uniform, and other substrate properties may be useful in preventing excessive stresses and subsequent cracking of the xerogel layer, particularly when its thickness is above 20 microns, and also useful in providing excellent image quality. Some of the desired substrates in ink jet printing media, such as canvas, cloth, non-woven fiber substrates, and some grades of paper, have very rough and non-uniform surfaces and are difficult to coat with the microporous xerogel layers which typically provide the premium ink jet image quality. One approach to overcome the surface deficiencies of the substrate is to pre-coat the substrate with a coating layer. This approach may reduce the surface roughness and non-uniformities, but involves the expense and complexity of an additional coating step, usually does not fully eliminate the surface deficiencies, and may negatively affect the ink jet imaging, such as by interfering with the microporosity and transport of liquids between the xerogel layer and the rough but porous substrate.

In another approach that may overcome the surface deficiencies of the substrate, the ink jet ink-receptive layer may be coated on a temporary carrier layer to form an ink jet ink printing media for imaging on an ink jet printer, as, for example, described in U.S. Pat. Nos. 5,795,425 and 5,837,375, both to Brault et al. Then, as part of a two step imaging process, the ink jet media is imaged on the ink jet printer followed by lamination of the imaged ink jet ink-receptive layer to a desired substrate and removal of the temporary carrier layer from the ink jet ink-receptive layer. This approach has the disadvantage of being a two-step imaging proess where the user may obtain excellent quality in the first imaging step, but then, after the effort and expense of imaging, the quality of the second lamination step may be unacceptable. Also, this two step imaging process requires the user to have the equipment for the second lamination step. It would be advantageous to have a one step imaging process for ink jet printing on ink jet ink printing media having rough, non-uniform substrates.

A method for preparing articles, such as electrochemical cells and ink jet printing media, which can avoid the foregoing problems often encountered with preparing articles comprising a microporous layer, particularly those comprising a microporous xerogel layer, would be of great value.

SUMMARY OF THE INVENTION

The present invention pertains to methods of preparing an article comprising a microporous layer, which methods comprise the steps of (a) coating a microporous layer on a temporary carrier substrate to form a microporous layer assembly, wherein the microporous layer has a first surface in contact with the temporary carrier substrate and has a second surface on the side opposite from the temporary carrier substrate; (b) laminating the second surface of the microporous layer to a substrate to form a microporous layer/substrate assembly; and (c) removing the temporary carrier substrate from the first surface of the microporous layer to form the article. In a preferred embodiment, the microporous layer comprises one or more microporous xerogel layers. In one embodiment, the microporous layer assembly further comprises one or more non-microporous coating layers, wherein the one or more non-microporous coating layers are in contact with at least one of the one or more microporous xerogel layers of the microporous layer. In one embodiment, one of the one or more microporous xerogel layers of the microporous layer is coated directly on the temporary carrier substrate. In one embodiment, one of the one or more non-microporous coating layers of the microporous layer assembly is coated directly on the temporary carrier substrate prior to coating the microporous layer, and the microporous layer is then coated on a surface of the one of the one or more non-microporous coating layers, which surface is on the side of the one of the one or more non-microporous coating layers opposite from the temporary carrier substrate, and further wherein the temporary carrier substrate is removed in step (c) from a surface of the one of the one or more non-microporous coating layers, which surface is on the side of the one of the one or more non-microporous coating layers opposite from the microporous layer. In one embodiment, one of the one or more non-microporous coating layers of the microporous layer assembly is coated after step (a) directly on the surface of the microporous layer, which surface is on the side of the microporous layer opposite from the temporary carrier substrate layer, prior to laminating to the substrate in step (b).

In a preferred embodiment, at least one of the one or more microporous xerogel layers comprises a xerogel material selected from the group consisting of pseudo-boehmites, zirconium oxides, titanium oxides, aluminum oxides, silicon oxides, and tin oxides. In one embodiment, the microporous layer comprises a microporous material prepared by vesiculation of an organic polymer layer, and wherein said vesiculation comprises a step of photolyzing or heating a gas forming compound. In one embodiment, the gas forming compound is an aromatic diazonium compound.

In one embodiment of the methods of preparing an article comprising a microporous layer of the present invention, the temporary carrier substrate is a flexible web substrate. Suitable web substrates include, but are not limited to, papers, polymeric films, and metals. In one embodiment, the flexible web substrate is surface treated with a release agent.

In one embodiment, the microporous layer assembly is a cathode/separator assembly, the substrate is an anode assembly, and the article is an electrochemical cell. The electrochemical cell may be a primary cell or a secondary cell.

In one embodiment, the microporous layer assembly is an ink jet ink-receptive coating assembly, the substrate is a flexible web substrate, and the article is an ink jet ink printing media.

In one embodiment, the microporous layer assembly is an ultrafiltration layer assembly, the substrate is a flexible web substrate, and the article is a filtration media.

In one embodiment, the microporous layer assembly is a separator assembly, the substrate is a first electrode assembly, and the article is a first electrode/separator assembly. In one embodiment, the methods further comprise the step of combining the first electrode/separator assembly with a second electrode assembly to prepare an electrochemical cell, a capacitor, or a fuel cell.

Another aspect of the present invention pertains to an article prepared by the methods of this invention, as described herein. In a preferred embodiment, the article is an ink jet ink printing media.

As will be appreciated by one of skill in the art, features of one aspect or embodiment of the invention are also applicable to other aspects or embodiments of the invention.

DETAILED DESCRIPTION OF THE INVENTION

Many microporous coatings, particularly microporous xerogel coatings which are typically subject to a high level of stresses and potential cracking during drying, formation, and mechanical handling of the three-dimensional gel structure in the microporous layer, are difficult to obtain at the desired quality level when coated on surfaces which are rough and non-uniform or which have poor mechanical strength and flexibility properties. A rough and non-uniform coating surface may cause a wide variation in the thicknesses of microporous coatings applied to this surface. Besides possibly causing the formation of sections of the microporous coating layer which are too thin for the desired application, these thickness variations may interfere with the desired level and uniformity of the microporosity and with the mechanical strength and cracking resistance of the microporous layer. This is particularly true when the thickness of the microporous coating layer is significantly above that needed for the desired application. Also, a coating surface with poor mechanical strength and flexibility may induce, for example, stresses, mechanical failure, poor adhesion, and cracking in a microporous layer coated on this surface. Examples of applications for microporous coatings, including microporous xerogel coatings, where a relatively smooth surface and a mechanically strong layer on which to apply and form the microporous coating would be useful, include, but are not limited to, microporous separators for contact to one or more electrodes of an electrochemical cell, capacitor, or fuel cell; microporous ink jet ink-receptive layers for contact to a wide variety of rough, uneven support surfaces such as papers, fabrics, canvas, and spun-woven plastics; and microporous filtration layers for contact to a wide variety of rough, uneven substrates such as papers. For example, for the product application of microporous separators involving contact to the positive electrode or cathode of an electrochemical cell, the roughness and non-uniformity of the cathode surface prior to coating the microporous separator layer on it may be reduced, for example, by calendering the cathode surface or by applying a thin uniform coating to the cathode surface. However, the reduction of the roughness and non-uniformity of the cathode surface by these approaches may still not be sufficient and also may not prevent undesirable results from poor mechanical strength and flexibility of the cathode and from penetration of the separator coating into porous areas of the cathode during the coating application process.

The present invention overcomes these limitations for preparing microporous coatings for a wide variety of applications, such as separators for use in electrochemical cells, ink jet ink-receptive media, filtration materials, and other product applications. One aspect of the present invention pertains to methods of preparing an article, which methods comprise the steps of (a) coating a microporous layer on a temporary carrier substrate, (b) coating any other desired layers in desired coating patterns built up on the surface of the microporous layer on the side opposite from the temporary carrier substrate, (c) laminating the microporous layer assembly resulting from steps (a) and (b) to a desired substrate, such as an anode assembly comprising an anode active layer, and (d) removing the temporary carrier substrate from the microporous separator layer before step (c) or, alternatively, after step (c). A lamination process similar to that of step (c) may be utilized in step (b) to coat the microporous layer by a lamination step of applying an assembly comprising, for example, a cathode active layer of the cathode to the surface of the microporous layer on the side opposite from the temporary carrier substrate, wherein the cathode active layer has a first surface in contact with the surface of the microporous layer and has a second surface on the side opposite from the temporary carrier substrate. In one embodiment of the lamination process in step (b), the assembly comprising, for example, the cathode active layer, further comprises a second temporary carrier substrate, and wherein, subsequent to step (b), there is a step of removing the second temporary carrier substrate from the assembly comprising the cathode active layer.

The surface of the temporary carrier substrate is selected to have the smoothness, mechanical strength, flexibility, and porosity properties that are desirable for the preparation of the microporous layer by coating on the surface of the temporary carrier substrate and to also have the suitable release properties for removal of the temporary carrier substrate. This method of applying a microporous layer to a temporary carrier substrate, subsequent coating and/or lamination of one or more other layers overlying the microporous layer, and the subsequent removal of the temporary carrier substrate from the microporous layer is particularly useful when the microporous layer comprises one or more microporous xerogel layers. Besides applications in electrochemical cells, this method may be readily adapted for a wide variety of other product applications, including ink jet ink-receptive media and filtration materials, where microporous coating layers may be utilized.

Figure 1:
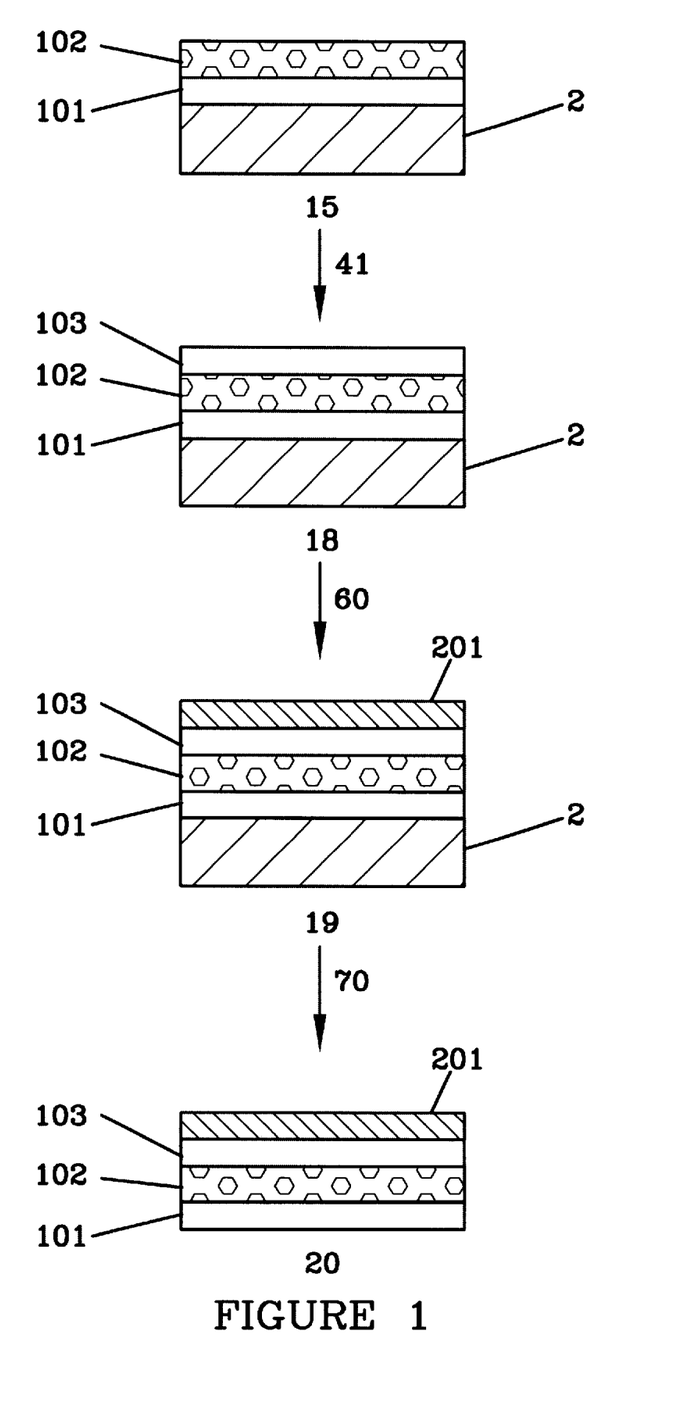
FIG. 1 shows a representative process flow diagram with cross-sectional views of one embodiment of the methods of preparing an article of the present invention, which comprises a non-microporous coating layer step 41, a lamination step 60, and a temporary carrier substrate removing step 70, starting with a microporous layer assembly 15 comprising a temporary carrier layer 2, a non-microporous coating layer 101, and a microporous layer 102.

One embodiment of the methods of the present invention is illustrated in FIG. 1. Referring to FIG. 1, in a non-microporous coating step 41, a non-microporous coating layer 103 is coated onto a surface of a microporous layer assembly 15 comprising a temporary carrier substrate 2, a non-microporous coating layer 101, and microporous layer 102, thereby forming microporous layer assembly 18. Next, in a lamination step 60, a substrate 201 is laminated onto the surface of the non-microporous coating layer 103 to form microporous layer/substrate assembly 19 comprising temporary carrier substrate 2, non-microporous coating layer 101, microporous layer 102, non-microporous coating layer 103, and substrate 201. Following this step, in a temporary carrier substrate removing step 70, the temporary carrier substrate 2 is removed from the microporous layer 102 of microporous layer/substrate assembly 19 to form an article 20 comprising non-microporous coating layer 101, microporous layer 102, non-microporous coating layer 103, and substrate 201.

The term "electrochemical cell," as used herein, pertains to an article that produces an electric current through an electrochemical reaction and that comprises a positive electrode or cathode, a negative electrode or anode, and an electrolyte element interposed between the anode and the cathode, wherein the electrolyte element comprises a separator layer and an aqueous or non-aqueous electrolyte in pores of the separator layer. Electrochemical cells may be primary or secondary cells.

The term "microporous" as used herein, pertains to the material of a layer, which material possesses pores of diameter of about 1 micron or less which are interconnected in a substantially continuous fashion from one outermost surface of the layer through to the other outermost surface of the layer. The term "microporous layer" is used herein to describe a layer, which layer may comprise one or more discrete coating layers, where the layer as a whole is microporous. Examples of microporous materials useful in the microporous separator layer of the methods of the present invention include, but are not limited to, inorganic xerogel layers or films, inorganic xerogel layers or films further comprising an organic polymer, and organic polymer layers or films that undergo vesiculation or pore formation upon gas formation, for example, by heating or photoirradiating an aromatic diazonium compound or other gas forming compound, as known for example in the art of preparing vesicular microfilm.

The terms "non-microporous layer" and "non-microporous coating layer" are used herein to pertain to a layer, which layer may comprise one or more discrete coating layers, where the layer as a whole is not microporous.

In one embodiment of the methods of preparing an article of this invention, the microporous layer comprises one or more microporous xerogel layers. By the terms "xerogel layer" and "xerogel structure," as used herein, is meant, respectively, a layer of a coating or the structure of a coating layer in which the layer and structure were formed by drying a liquid sol or sol-gel mixture to form a solid gel matrix as, for example, described in Chem. Mater., Vol. 9, pages 1296 to 1298 (1997) by Ichinose et al. for coating layers of metal-oxide based xerogels. Thus, if the liquid of the gel formed in the liquid sol-gel mixture is removed substantially, for example, though formation of a liquid-vapor boundary phase, the resulting gel layer or film is termed, as used herein, a xerogel layer. As the liquid is removed from the gel in the liquid sol-gel mixture by, for example, evaporation, large capillary forces are exerted on the pores, forming a collapsed structure for the xerogel layer. The pore sizes of the xerogel layer and structure are very small, having average pore diameters less than 300 nm or 0.3 microns.

Thus, the microporous xerogel layer of the methods of this invention comprises a dried microporous three-dimensional solid gel network with pores which are interconnected in a substantially continuous fashion from one outermost surface of the layer through to the other outermost surface of the layer. A continuous xerogel coating layer has the materials of the xerogel in a continuous structure in the coating layer, i.e., the materials are in contact and do not have discontinuities in the structure, such as a discontinuous layer of solid pigment particles that are separated from each other. In contrast, xerogel pigment particles may be formed by a xerogel process involving drying a liquid solution of a suitable precursor to the pigment to form a dried mass of xerogel pigment particles, which is typically then ground to a fine powder to provide porous xerogel pigment particles. The terms "xerogel coating" and "xerogel coating layer," as used herein, are synonymous with the term "xerogel layer".

The term "binder," as used herein, pertains to inorganic or organic materials which form a continuous structure or film in a substantially continuous fashion from one outermost surface of a coating layer through to the other outermost surface of the coating layer. As such, for example, the xerogel, such as pseudo-boehmite or other metal oxide xerogel, of a xerogel layer is also a binder in addition to having a xerogel structure with ultrafine pores.

A wide variety of materials known to form microporous xerogel layers when coated on a surface may be used to provide the microporous layers for the methods of the present invention. Suitable materials for use in the microporous xerogel layers of the microporous layer of the methods of the present invention include, but are not limited to, pseudo-boehmites, zirconium oxides, titanium oxides, aluminum oxides, silicon oxides, and tin oxides.

In a preferred embodiment of the methods of preparing an article of this invention, the microporous layer comprises one or more microporous pseudo-boehmite layers. Microporous pseudo-boehmite layers for use as separators in electrochemical cells are described in copending U.S. patent application Ser. Nos. 08/995,089 and 09/215,112, both to Carlson et al. of the common assignee, the disclosures of which are fully incorporated herein by reference. The term "pseudo-boehmite," as used herein, pertains to hydrated aluminum oxides having the chemical formula $Al_2O_3.xH_2O$ wherein x is in the range of from 1.0 to 1.5. Terms, as used herein, which are synonymous with "pseudo-boehmite," include "boehmite," "AlOOH," and "hydrated alumina." The materials referred to herein as "pseudo-boehmite" are distinct from anhydrous aluminas ($Al_2O_3$, such as alpha-alumina and gamma-alumina), and hydrated aluminum oxides of the formula $Al_2O_3.xH_2O$ wherein x is less than 1.0 or greater than 1.5.

The amount of the pores in a microporous layer may be characterized by the pore volume, which is the volume in cubic centimeters of pores per unit weight of the layer. The pore volume may be measured by filling the pores with a liquid having a known density and then calculated by the increase in weight of the layer with the liquid present divided by the known density of the liquid and then dividing this quotient by the weight of the layer with no liquid present, according to the equation:

$$Pore\ Volume = \frac{[W_1 - W_2]/d}{W_2}$$

where $W_1$ is the weight of the layer when the pores are completely filled with the liquid of known density, $W_2$ is the weight of the layer with no liquid present in the pores, and d is the density of the liquid used to fill the pores. Also, the pore volume may be estimated from the apparent density of the layer by subtracting the reciprocal of the theoretical density of the materials (assuming no pores) comprising the microporous layer from the reciprocal of the apparent density or measured density of the actual microporous layer, according to the equation:

$$Pore\ Volume = \left(\frac{1}{d_1} - \frac{1}{d_2}\right)$$

where $d_1$ is the density of the layer which is determined from the quotient of the weight of the layer and the layer volume as determined from the measurements of the dimensions of the layer, and $d_2$ is the calculated density of the materials in the layer assuming no pores are present or, in other words, $d_2$ is the density of the solid part of the layer as calculated from the densities and the relative amounts of the different materials in the layer. The porosity or void volume of the layer, expressed as percent by volume, can be determined according to the equation:

$$Porosity = \frac{100\,(Pore\ Volume)}{[Pore\ Volume + 1/d_2]}$$

where pore volume is as determined above, and $d_2$ is the calculated density of the solid part of the layer, as described above.

In one embodiment, the microporous xerogel layer of the microporous layer of the methods of the present invention has a pore volume from 0.02 to 2.0 cm$^3$/g. In a preferred embodiment, the microporous xerogel layer has a pore volume from 0.3 to 1.0 cm$^3$/g. In a more preferred embodiment, the microporous xerogel layer has a pore volume from 0.4 to 0.7 cm$^3$/g.

The microporous xerogel layers of the microporous layer of the methods of the present invention have pore diameters which range from 0.3 microns down to less than 0.002 microns. In one embodiment, the microporous xerogel layer has an average pore diameter from 0.001 microns or 1 nm to 0.3 microns or 300 nm. In a preferred embodiment, the microporous xerogel layer has an average pore diameter from 0.001 microns or 1 nm to 0.030 microns or 30 nm. In a more preferred embodiment, the microporous xerogel layer has an average pore diameter from 0.003 microns or 3 nm to 0.010 microns or 10 nm.

One distinct advantage of microporous layers with much smaller pore diameters on the order of 0.001 to 0.03 microns is that insoluble particles, even colloidal particles with diameters on the order of 0.05 to 1.0 microns, can not pass through the microporous layer because of the ultrafine pores. In contrast, for example, colloidal particles, such as conductive carbon powders often incorporated into cathode compositions of electrochemical cells, may readily pass through conventional microporous layers, such as microporous polyolefins, and thereby may migrate to undesired areas of the cell.

Another significant advantage of the microporous layer comprising one or more microporous xerogel layers of the methods of the present invention is that the nanoporous structure of the xerogel layer may function as an ultrafiltration membrane and, in addition to blocking all particles and insoluble materials, may block or significantly inhibit the diffusion of soluble materials of relatively low molecular weights, such as 2,000 or higher, while permitting the diffusion of soluble materials with molecular weights below this cutoff level. This property may be utilized to advantage in coating other layers onto the surface of the microporous layer by preventing any undesired penetration of pigments and other materials into the microporous layer. For example, with electrochemical cells, this property may also be utilized to advantage in selectively impregnating or imbibing materials into the microporous separator layer during manufacture of the electrochemical cell or in selectively permitting diffusion of very low molecular weight materials through the microporous separator layer during all phases of the operation of the cell while blocking or significantly inhibiting the diffusion of insoluble materials or of soluble materials of medium and higher molecular weights.

Another important advantage of the extremely small pore diameters of the microporous xerogel layer of the microporous layer of the methods of the present invention is the strong capillary action of the tiny pores in the xerogel layer which enhances the capability of the microporous layers to readily take up or imbibe liquids, such as electrolyte liquids and ink jet ink liquids, and to retain these liquids in pores within the microporous layer.

The microporous layers of the methods of this invention may optionally further comprise a variety of binders (in addition to the binder, such as for example a pseudo-boehmite xerogel, that provides the primary microporous structure of the separator layer), to improve the mechanical strength and other properties of the layer, as for example, described for microporous pseudo-boehmite xerogel layers for microporous separator layers in the two aforementioned copending U.S. patent application Ser. Nos. 08/995,089 and 09/215,112, both to Carlson et al. of the common assignee. Any binder that is compatible with the microporous material of the microporous layer may be used. For microporous xerogel layers, any binder that is compatible with the xerogel precursor sol during mixing and processing into the microporous xerogel layer and provides the desired mechanical strength and uniformity of the layer without significantly interfering with the desired microporosity is suitable for use. The preferred amount of binder is from 5% to 70% of the weight of the xerogel-forming material in the layer. Below 5 weight per cent, the amount of binder is usually too low to provide a significant increase in mechanical strength. Above 70 weight per cent, the amount of binder is usually too high and fills the pores to an excessive extent, which may interfere with the microporous properties and with the transport of low molecular weight materials through the layer. The binder may be inorganic, for example, another xerogel-forming material, such as silicas, gamma aluminum oxides, and alpha aluminum oxides, that are known to be compatible with the primary xerogel-forming material, such as pseudo-boehmite, present in the microporous layer, for example, as is known in the art of ink-receptive microporous xerogel layers for ink jet printing. In one embodiment, the binders in the microporous xerogel layer are organic polymer binders. Examples of suitable binders include, but are not limited to, polyvinyl alcohols, cellulosics, polyvinyl butyrals, urethanes, polyethylene oxides, copolymers thereof, and mixtures thereof. Binders may be water soluble polymers and may have ionically conductive properties. Suitable binders may also comprise plasticizer components such as, but not limited to, low molecular weight polyols, polyalkylene glycols, and methyl ethers of polyalkylene glycols to enhance the coating, drying, and flexibility of the microporous xerogel layer.

The thickness of the microporous layer of the methods of the present invention may vary over a wide range since the basic properties of microporosity and mechanical integrity are present in layers of a few microns in thickness as well as in layers with thicknesses of hundreds of microns. The microporous layer may be coated in a single coating application or in multiple coating applications to provide the desired overall thickness. For various reasons including cost, overall performance properties of the microporous layer, and ease of manufacturing, the desirable overall thicknesses of the microporous layer are typically in the range of 1 micron to 25 microns.

In the methods of preparing an article of the present invention, the temporary carrier substrate functions as a temporary support to the superposed layers during the process steps of this invention and may be any web or sheet material possessing suitable smoothness, flexibility, dimensional stability, and adherence properties in the microporous layer assembly. In one embodiment of the methods of preparing an article of the present invention, the temporary carrier substrate is a flexible web substrate. Suitable web substrates include, but are not limited to, papers, polymeric films, and metals. A typical flexible polymeric film for use as the temporary carrier substrate is a polyethylene terephthalate film. In a preferred embodiment, the flexible web substrate is surface treated with a release agent to enhance desired release characteristics, such as by treatment with a silicone release agent. This surface treatment or coating with a release agent of the temporary carrier substrate may be done on a multistation coating machine in the same coating pass as that used to later apply the first layer of the microporous layer assembly in the methods of this invention. Examples of suitable flexible web substrates include, but are not limited to, resin-coated papers such as papers on which a polymer of an olefin containing 2 to 10 carbon atoms, such as polyethylene, is coated or laminated; and transparent or opaque polymeric films such as polyesters, polypropylene, polystyrene, polycarbonates, polyvinyl chloride, polyvinyl fluoride, polyacrylates, and cellulose acetate. The temporary carrier substrate may be of a variety of thicknesses, such as, for example, thicknesses in the range of 2 to 100 microns.

One benefit is that the temporary carrier substrate, after its removal from the microporous layer/substrate assembly, may be reused for preparing another article, may be reused for a different product application, or may be reclaimed and recycled. Any such reuses combine to lower the effective cost of the temporary carrier substrate in preparing the article.

In a preferred embodiment of the methods of preparing an article of the present invention, the microporous layer comprises one or more microporous xerogel layers, and more preferably, the microporous layer assembly further comprises one or more non-microporous coating layers, wherein the one or more non-microporous coating layers are in contact with at least one of the one or more microporous xerogel layers. In one embodiment, one of the one or more microporous xerogel layers of the microporous layer is coated directly on the temporary carrier substrate. In one embodiment, one of the one or more non-microporous coating layers of the microporous layer assembly is coated directly on the temporary carrier substrate.

The incorporation of one or more non-microporous coating layers in the microporous layer assembly of the methods of this invention may enhance the mechanical strength and add flexibility to the microporous layer comprising one or more discrete microproous layers, particularly those microporous layers comprising one or more microporous xerogel layers. The non-microporous coating layers may also provide specific functional properties to the article, such as adhesion to the substrate, ability to absorb specific liquids, and specific gloss, opacity, and other optical properties. The thickness of the non-microporous coating layers of the microporous layer assembly of the methods of this invention may vary over a wide range, such as, but not limited to, from 0.2 microns to 200 microns.

To achieve the desired coating properties, the one or more non-microporous coating layers may comprise polymers, pigments, and other materials known in the art of non-microporous coatings, especially those known for use in flexible and durable coatings. Examples of other coating materials include, but are not limited to, photosensitizers for radiation curing of any monomers and macromonomers present; catalysts for non-radiation curing of any monomers, macromonomers, or polymers present; crosslinking agents such as zirconium compounds, aziridines, and isocyanates; surfactants; plasticizers; dispersants; flow control additives; and rheology modifiers.

The microporous layer assembly of the methods of the present invention may have more than one microporous layer. Also, the microporous layer assembly of the methods of the present invention may have more than one non-microporous coating layer. The compositions of these multiple microporous layers may be the same or different for each such layer in the microporous layer assembly. Also, the compositions of these multiple non-microporous coating layers may be the same or different for each such layer in the microporous layer assembly. The many possible combinations of microporous layers and non-microporous coating layers also include a non-microporous coating layer intermediate between two microporous layers.

Figure 2A:
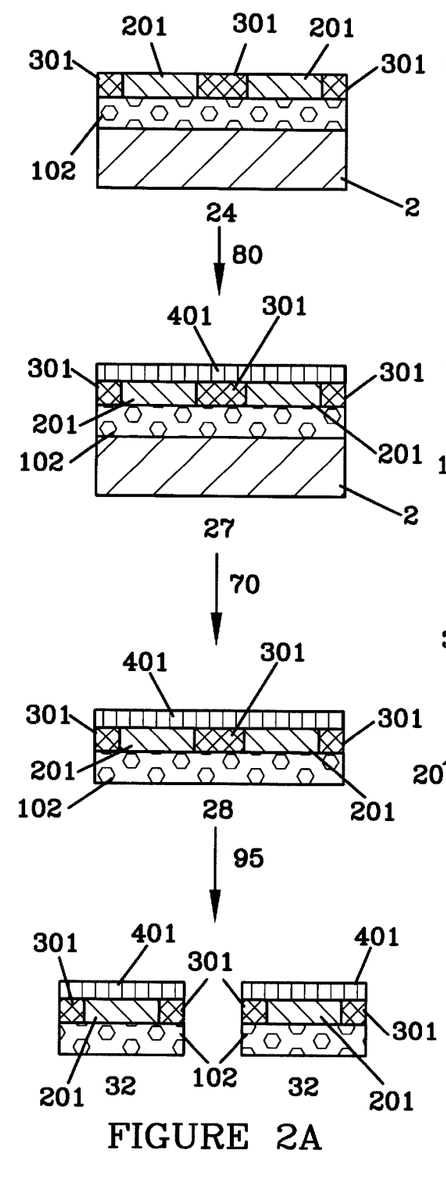
FIGS. 2A and 2B show representative process flow diagrams with cross-sectional views of two other embodiments of the methods of preparing an article of this invention, which comprises, for FIG. 2A, a lamination step 80 prior to the temporary carrier substrate removing step 70; and which comprises, for FIG. 2B, a lamination coating step 80 and a slitting step 95 prior to the temporary carrier substrate removing step 70, where these steps are done starting with a microporous layer assembly 24 comprising a temporary carrier substrate 2, a microporous layer 102, and two different non-microporous coating layers 201 and 301.
Figure 2B:
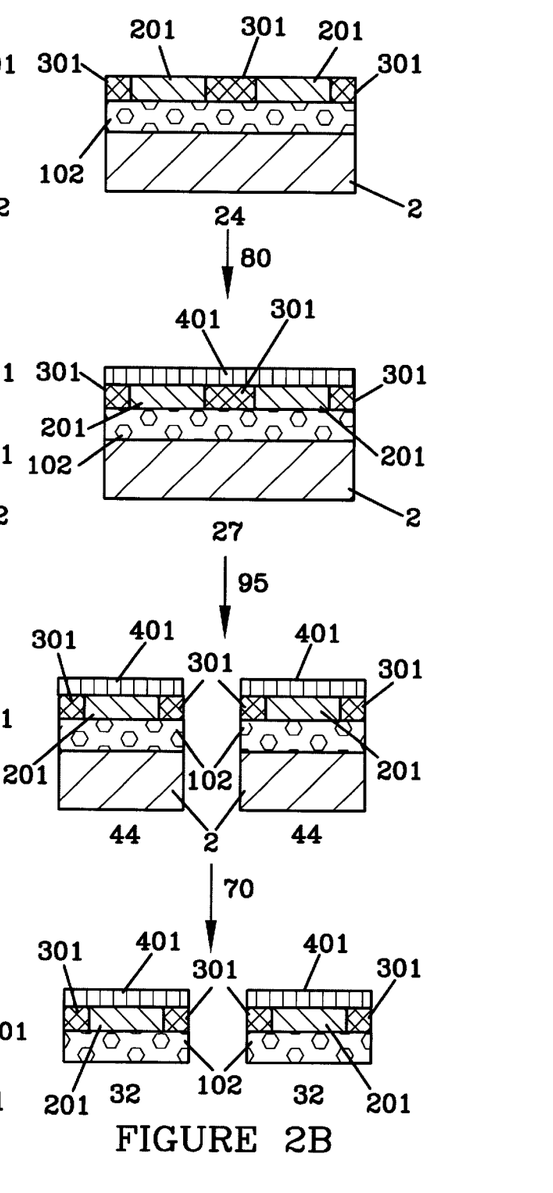

In one embodiment, the step of removing the temporary carrier substrate occurs prior to or, alternatively, subsequent to a slitting step, for example, as illustrated in FIGS. 2A and 2B. Referring to FIG. 2A, in a lamination step 80, a substrate 401 is laminated to a microporous layer assembly 24 comprising a temporary carrier substrate 2, a microporous layer 102, and two different non-microporous coating layers 201 and 301. This step 80 forms microporous layer/substrate assembly 27 comprising substrate 401, non-microporous coating layers 201 and 301, microporous layer 102, and temporary carrier substrate 2. Next, in a temporary carrier substrate removing step 70, the temporary carrier substrate 2 is removed from the microporous layer 102 of microporous layer/substrate assembly 27 to form article 28 comprising substrate 401, non-microporous coating layers 201 and 301, and microporous layer 102. If a smaller dimension is desired for article 28, in a slitting step 95, article 28 may be cut or slit to form multiples of article 32 comprising substrate 401, non-microporous coating layers 201 and 301, and microporous layer 102. Referring to FIG. 2B, this is similar to FIG. 2A except that the sequence of the slitting step 95 and the temporary carrier substrate removing step 70 are reversed. In both FIG. 2A and FIG. 2B, the final product is article 32.

The various coating layers in the methods of preparing a microporous layer assembly of the present invention may be coated from a liquid mixture comprising a liquid carrier medium and the solid materials of the layer which are dissolved or dispersed in the liquid carrier medium. The choice of the liquid carrier medium may vary widely and includes water, organic solvents, and blends of water and organic solvents. Exemplary organic solvents include, but are not limited to, alcohols, ketones, esters, and hydrocarbons. The choice of the liquid carrier medium depends mainly on the compatibility with the particular solid materials utilized in the specific coating layer, on the type of method of coating application to the receiving surface, and on the requirements for wettability and other coating application properties of the particular receiving surface for the coating. For example, for coating a microporous xerogel layer, the liquid carrier medium is typically water or a blend of water with an alcohol solvent, such as isopropyl alcohol or ethyl alcohol, since the sol-gel materials that dry and condense to form the xerogel layer typically are most compatible with a water-based, highly polar liquid carrier medium.

The application of the liquid coating mixture to the temporary carrier substrate or other layer may be done by any suitable process, such as the conventional coating methods, for example, of wire-wound rod coating, spray coating, spin coating, reverse roll coating, gravure coating, slot extrusion coating, gap blade coating, and dip coating. The liquid coating mixture may have any desired solids content that is consistent with the viscosity and rheology that is acceptable in the coating application method. After the liquid coating mixture is applied on the temporary carrier substrate or other layer, the liquid carrier medium is typically removed to provide a dried, solid coating layer. This removal of the liquid carrier medium may be accomplished by any suitable process, such as conventional methods of drying, for example, hot air at a high velocity or exposure to ambient air conditions. Some layers of the microporous layer assembly of the present invention such as, for example, non-microporous current collector layers, may be formed by techniques such as vacuum deposition, ion-sputtering, vacuum flash evaporation, and other methods as known in the art.

A wide variety of articles comprising a microporous layer may be prepared by utilizing the methods of the present invention. Suitable articles for preparation by the methods of this invention include, but are not limited to, electrochemical cells, capacitors, fuel cells, ink jet printing and other imaging media, and filtration media. In the case of electric current producing articles such as electrochemical cells, capacitors, and fuel cells, which typically have two electrodes and a microporous separator or membrane layer interposed between the two electrodes, the microporous layer assembly may be a first electrode/separator assembly, the substrate may be a second electrode assembly such as a second electrode on a second temporary carrier substrate, and the article may be the electrochemical cell, capacitor, or fuel cell depending on the specific electrodes, separator, and other components utilized, as known in the art of these various electric current producing articles. Alternatively, the microporous layer assembly may be a separator assembly, the substrate may be a first electrode assembly such as a cathode assembly or an anode assembly, and the article may be a first electrode/separator assembly such as a cathode/separator assembly.

For ink jet printing media, the microporous layer assembly may be an ink jet ink-receptive coating assembly such as one of the single or multiple coating layer designs comprising a microporous layer as known in the art of ink jet printing media, the substrate may be a flexible web substrate such as cloth, canvas, paper, and non-woven plastics, and the article is an ink jet printing media.

For filtration media, the microporous layer assembly may be an ultrafiltration layer assembly such as a single or multiple coating layer designs comprising at least one microporous layer as known in the art of filtration media, the substrate may be a flexible web substrate such as a paper, and the article is a filtration media. The methods of this invention are particularly advantageous for preparing filtration media since the ultrafiltration properties of a microporous xerogel layer may be placed next to the paper surface by the lamination step to the rough surface of the paper with the option of coarser filtration layers on the side of the xerogel layer opposite to the paper. Direct coating of the microporous xerogel layer on the rough paper substrates typically used in filtration media would be extremely difficult to achieve if the full ultrafiltration properties of the xerogel layer are required.

Another aspect of the present invention pertains to articles prepared according to the methods of the present invention, as described herein. Thus, the articles of the present invention comprise a microporous layer, which articles are prepared according to the methods of this invention. Examples of such articles include, but are not limited to, electrochemical cells, ink jet printing media, filtration media, electrode/separator assemblies, capacitors, and fuel cells, as described herein.

EXAMPLES

Several embodiments of the present invention are described in the following example, which are meant by way of illustration and not by way of limitation.

Example 1

A coating mixture for a microporous ink jet ink-receptive layer was prepared by adding 23.8 g of a 13.5% by weight solids solution of boehmite sol in water (DISPAL 11N7-12, a trademark for aluminum boehmite sols available from CONDEA Vista company, Houston, Tex.) to 14.2 g of a 4% by weight solution of polyvinyl alcohol (AIRVOL 125, a trademark for polyvinyl alcohol polymers available from Air Products, Inc. Allentown, Pa.) in water and stirring to mix the materials. 0.05 g of FLUORAD FC-430, a trademark for non-ionic fluorochemical surfactants available from 3M Corporation, St. Paul, Minn., was added with stirring to make the final microporous coating mix. Using a gap coating with a doctor blade and a hand coating process, the microporous coating mix was applied to the non-treated surface of 23 micron thick A non-microporous coating layer of polyethylene oxide (900,000 MW from Aldrich Chemical Company, Milwaukee, Wis.) was prepared by coating a 2% by weight solution in water onto the microporous ink jet ink-receptive layer using the gap coating bar with a doctor blade. After drying at 130° C. in a convection oven, a uniform non-microporous coating layer with a dry thickness of 5 microns was formed on the microporous layer.

The resulting microporous layer assembly of PET film as the temporary carrier substrate, the microporous ink jet ink-receptive layer, and the non-microporous coating layer was then laminated to a sheet of standard grade xerographic bond paper by using a pressure roller process with the surface of the non-microporous coating layer in contact to the paper. Following this lamination step, the PET film, which had a low level of adhesion to the microporous layer, was easily removed by delamination and peeling off the PET film. The resulting ink jet printing media article comprising the paper substrate, the non-microporous coating layer, and the microporous ink jet ink-receptive layer on its outer surface with the non-microporous coating layer now interposed between the microporous layer and the substrate, was imaged on an HP 861 color ink jet ink printer (a trademark for products from Hewlett Packard Corporation, Palo Alto, Calif.). The resulting color quality and rate of drying of the ink was excellent. Because the top surface of the microporous layer had orginally been coated on the smooth PET film, this top surface of the microporous layer was very smooth and had a high gloss, which is a very desirable feature for ink jet printing, particularly for digital photographic applications.

While the invention has been described in detail and with reference to specific and general embodiments thereof, it will be apparent to one skilled in the art that various changes and modifications can be made therein without departing from the spirit and scope thereof.

What is claimed is:

1. A method of preparing an article comprising a microporous layer, said method comprising the steps of:
   (a) coating a microporous layer on a temporary carrier substrate to form a microporous layer assembly, wherein said microporous layer has a first surface in contact with said temporary carrier substrate and has a second surface on the side opposite from said temporary carrier substrate;
   (b) laminating said second surface of said microporous layer to a substrate to form a microporous layer/substrate assembly; and
   (c) removing said temporary carrier substrate from said first surface of said microporous layer to form said article;

wherein said microporous layer comprises one or more microporous xerogel layers and wherein said one or more microporous xerogel layers are formed by drying a liquid sol to form a solid metal oxide gel matrix with pores which are interconnected in a continuous fashion from one outermost surface of said xerogel layer through to the other outermost surface of said xerogel layer.

2. The method of claim 1, wherein said microporous layer assembly further comprises one or more non-microporous coating layers, wherein said one or more non-microporous coating layers are in contact with at least one of said one or more microporous xerogel layers.

3. The method of claim 2, wherein one of said one or more microporous xerogel layers is coated in step (a) on said temporary carrier substrate.

4. The method of claim 2, wherein one of said one or more non-microporous coating layers is coated in step (a) on said temporary carrier substrate prior to coating said microporous layer, wherein said one of the one or more non-microporous coating layers has a first surface in contact with the temporary carrier substrate and has a second surface on the side opposite from said temporary carrier substrate, and said microporous layer is coated in step (a) on said second surface of said one of the one or more non-microporous coating layers; wherein said microporous layer has a first surface in contact with said second surface of said one of the one or more non-microporous coating layers; and further wherein said temporary carrier substrate in step (c) is removed from said first surface of said one of the one or more non-microporous coating layers to form said article.

5. The method of claim 2, wherein one of said one or more non-microporous coating layers of said microporous layer assembly is coated on said second surface of said microporous layer prior to step (b), wherein said one of the one or more non-microporous coating layers has a first surface in contact with said second surface of said microporous layer and has a second surface on the side opposite from said microporous layer, and said substrate is laminated in step (b) to said second surface of said one of the one or more non-microporous coating layers.

6. The method of claim 1, wherein at least one of said one or more microporous xerogel layers comprises a material selected from the group consisting of pseudo-boehmites, zirconium oxides, titanium oxides, aluminum oxides, silicon oxides, and tin oxides.

7. The method of claim 1, wherein said microporous layer comprises a microporous material prepared by vesiculation of an organic polymer layer, and wherein said vesiculation results from photolyzing or heating a gas forming compound.

8. The method of claim 7, wherein said gas forming compound is an aromatic diazonium compound.

9. The method of claim 1, wherein said temporary carrier substrate is a flexible web substrate.

10. The method of claim 9, wherein said flexible web substrate is selected from the group consisting of papers, polymeric films, and metals.

11. The method of claim 9, wherein said flexible web substrate is surface treated with a release agent.

12. The method of claim 1, wherein said microporous layer assembly is a cathode/separator assembly, said substrate is an anode assembly, and said article is an electrochemical cell.

13. The method of claim 12, wherein said electrochemical cell is a secondary cell.

14. The method of claim 12, wherein said electrochemical cell is a primary cell.

15. The method of claim 1, wherein said microporous layer assembly is an ink jet ink-receptive coating assembly, said substrate is a flexible web substrate, and said article is an ink jet printing media.

16. The method of claim 1, wherein said microporous layer assembly is an ultrafiltration layer assembly, said substrate is a flexible web substrate, and said article is a filtration media.

17. The method of claim 1, wherein said microporous layer assembly is a separator assembly said substrate is a first electrode assembly, and said article is a first electrode/separator assembly.

18. The method of claim 17, wherein said method further comprises a step of combining said first electrode/separator assembly with a second electrode assembly to prepare an electrochemical cell.

19. The method of claim 17, wherein said method further comprises a step of combining said first electrode/separator assembly with a second electrode assembly to prepare a capacitor.

20. The method of claim 17, wherein said method further comprises a step of combining said first electrode/separator assembly with a second electrode assembly to prepare a fuel cell.

21. A method of preparing an article comprising a microporous layer, said method comprising the steps of:
   (a) coating a microporous layer on a temporary carrier substrate to form a microporous layer assembly, wherein said microporous layer has a first surface in contact with said temporary carrier substrate and has a second surface on the side opposite from said temporary carrier substrate;
   (b) coating an overlying layer on said second surface of said microporous layer, wherein said overlying layer has a first surface in contact with said second surface of said microporous layer and has a second surface on the side opposite from said microporous xerogel layer; and
   (c) removing said temporary carrier substrate from said first surface of said microporous layer to form said article;
      wherein said microporous layer comprises one or more microporous xerogel layers and wherein said one or more microporous xerogel layers are formed by drying a liquid sol to form a solid metal oxide gel matrix with pores which are interconnected in a continuous fashion from one outermost surface of said xerogel layer through to the other outermost surface of said xerogel layer.

22. The method of claim 1, wherein said overlying layer is a non-microporous coating layer.

23. The method of claim 21, wherein said microporous layer assembly of step (a) is a filtration layer assembly and said article is a filtration media.

24. A method of preparing an article comprising a microporous layer, said method comprising the steps of:
   (a) coating a microporous layer on a temporary carrier substrate to form a microporous layer assembly, wherein said microporous layer has a first surface in contact with said temporary carrier substrate and has a second surface on the side opposite from said temporary carrier substrate;
   (b) coating an overlying layer on said second surface of said microporous layer, wherein said overlying layer has a first surface in contact with said second surface of said microporous layer and has a second surface on the side opposite from said microporous xerogel layer;
   (c) laminating said second surface of said overlying layer to a substrate to form a microporous layer/substrate assembly; and
   (d) removing said temporary carrier substrate from said first surface of said microporous layer to form said article;
      wherein said microporous layer comprises one or more microporous xerogel layers and wherein said one or more microporous xerogel layers are formed by drying a liquid sol to form a solid metal oxide gel matrix with pores which are interconnected in a continuous fashion from one outermost surface of said xerogel layer through to the other outermost surface of said xerogel layer.

25. The method of claim 24, wherein said overlying layer is a non-microporous coating layer.

26. The method of claim 24, wherein said microporous layer assembly of step (a) is a filtration layer assembly, said substrate of step (c) is a flexible web substrate, and said article is a filtration media.

* * * * *